2,792,422

MANUFACTURE OF THIOPHENOLS

James O. Harris, St. Albans, and William A. Vaughn, Nitro, W. Va., assignors to Monsanto Chemical Company, St. Louis, Mo., a corporation of Delaware No Drawing. Application April 7, 1953,
Serial No. 347,398

7 Claims. (Cl. 260—609)

This invention relates to improvements in the manufacture of thiophenols. It is concerned with the preparation of thiophenols from aryl sulfonyl chlorides by conversion to a sulfinate and subsequent reduction to the thiophenol. More particularly the invention relates to improvements in the step of reducing a zinc aryl sulfinate to a thiophenol.

The yield of benzenthiol obtained by reducing zinc benzene sulfinate has not heretofore been satisfactory although the reaction has been extensively studied. Investigation of the process by Winters, American Chemical Journal 31, p. 572 (1904) resulted in the conclusion that no manipulation of the details of reducing zinc benzene sulfinate by several workers in the laboratory resulted in bringing about the desired yields. Accordingly, more expensive reducing agents had to be employed. It has been proposed to avoid the formation of the difficultly soluble zinc aryl sulfinates by adding zinc to an aqueous suspension of an aryl sulfonyl chloride below the temperature at which the sulfinate forms, thereafter adding a mineral acid and cautiously heating to reaction temperature. Satisfactory yields of benzenethiol can be obtained by reducing benzene sulfonyl chloride with zinc and sulfuric acid, Organic Syntheses, edited by Adams and Marvel, I, p. 71 (1921). The directions admonish that it is absolutely essential to keep the temperature very low except during the final refluxing period otherwise poor yields result. The recommended temperature is in the vicinity of —5° C. Similarly Winters supra indicates that in the reduction of zinc benzene sulfinate the temperature should be kept low. Apparently the formation of by-products becomes excessive at higher temperatures. However, these processes are difficult to control. The reactions are all exothermic and much heat is evolved. Although the reactions are merely inconvenient to carry out on a small scale, they are extremely dangerous on large scale operations.

It is an object of the present invention to provide an easily controlled process for manufacturing a thiophenol in satisfactory yield. A further object is to accomplish the foregoing economically. A still further object is to provide a safe process adaptable to any size operation. Still another object is to avoid the necessity of operating at very low temperatures with the accompanying expense and inconvenience of providing for the large heat transfer. A further specific object of the invention is to effect improvements in the step of reducing zinc benzene sulfinate. Other and further objects will be apparent from the detailed description following.

According to the present invention it has been discovered that satisfactory yields with safe convenient control of the reaction are obtained by gradually adding to an admixture of zinc metal and a zinc aryl sulfinate a nonoxidizing mineral acid at a temperature sufficiently high to effect the desired reaction during the addition of the acid. By carrying out the reaction in this manner there is no sudden surge of reaction but on the contrary a smooth reduction over the entire reaction period. Slight cooling may be necessary since as noted the reactions are exothermic but this is very easily accomplished. So long as it is high enough to effect reaction the temperature is not especially critical. However, it is extremely important to maintain a safe minimum temperature. For the manufacture of benzenthiol this is about 50° C. By avoiding the addition of any acid below a temperature high enough to effect rapid reaction there is no opportunity for buildup of an appreciable concentration of unreacted constituents. On the other hand extremely dangerous situations were encountered in carrying out the conventional low temperature reaction. In one instance the temperature of the reaction mixture rose from 3° C. to 23° C. in 20 minutes in spite of a heat exchanger at —25° C. In another instance the temperature of the reaction was carefully raised to 48° C. without incident but then the temperature rose spontaneously to violent refluxing in 7 minutes in spite of 17° C. cooling water.

Contrary to expectations the yields are fully equivalent to those obtained by reaction at the low temperatures heretofore accepted as critical. Yields of benzenthiol above 90% of the theoretical can be obtained with absolutely no danger of a runaway reaction irrespective of the batch size. Moreover, the reaction time cycles are reduced to one-half or even one-fourth of those of conventional low temperature operation. A period of refluxing the reaction mixture has heretofore been recommended but investigation shows that this was unnecessary with the herein described procedure. An efficient, rapid complete reaction takes place during the addition of the acid, permitting short time cycles. Sulfuric acid is preferred although other non-oxidizing mineral acids such as hydrochloric acid can be used. Metallic zinc is preferably in the form of zinc dust but this is not essential.

It is convenient to carry out the preparation of the zinc aryl sulfinate in the same vessel as subsequently used for reduction of this intermediate to the thiol. The intermediate is prepared in known manner by the action of the aryl sulfonyl chloride and metallic zinc in warm water. For example the addition of benzene sulfonyl chloride to zinc dust slurried in water at 35–50° C. results in formation of zinc benzene sulfinate. All of the zinc required for both reactions may be added to the water at the beginning. In fact it is desirable to do this. At least 3 moles of zinc per mole of the aryl sulfonyl chloride should be employed. An excess of about 50% of that theoretically required is desirable for optimum yields. For the reduction of the intermediate at least about 3 moles of acid per mole of the aryl sulfonyl chloride initially charged should be used. The theoretical requirement is 2½ moles of acid per mole of sulfonyl chloride. Optimum results are obtained with about 100–130% excess over that theoretically required. A temperature somewhat higher than that used for the preparation of zinc benzene sulfinate is desirable for the reduction to benzenethiol.

The following are examples which illustrate in greater detail the principles of the invention.

Example 1

Approximately 24 parts by weight (0.37 mole) of zinc dust was slurried into 250 parts by weight of water and heated to 50° C. To the warm water 44 parts by weight (0.25 mole) of benzene sulfonyl chloride was added over a period of about 15 minutes while keeping the temperature at 50–60° C. with 45° C. cooling water. There was then added in one portion 56 parts by weight of zinc dust (0.86 mole) and there was then gradually added 150.5 parts by weight (1.43 moles) of 93% sulfuric acid. The temperature of the reaction mixture was kept at 50–60° C. during the addition of the acid. The temperature was easily regulated by controlling the rate of addition of the acid and by use of a water bath at 45° C. After all the acid was added the water bath was removed. The temperature rose 3 to 5° C. and then began to fall, indicating that the reaction was complete. The product was isolated by heating the reaction mixture to refluxing temperature, collecting the refluxing liquid consisting of about half water and half benezenethiol, separating the lower layer and drying. A yield of 91.6% of benzenethiol was obtained.

*Example 2*

Into a 150 gallon glass lined reactor was charged 700 pounds of water and 213 pounds (3.28 moles) of zinc dust. The slurry was heated to 35° C. and the system purged with nitrogen, the flow of nitrogen through the system being maintained until the reaction was complete. Benzene sulfonyl chloride, 123 pounds (0.7 mole), was fed to the zinc-water mixture over a 45 minute period while keeping the reaction temperature at 35-50° C. The temperature was regulated by the rate of addition and by 18° C. cooling water. The temperature was then adjusted to 50° C. and held at 50-60° C. while 422 pounds (4.0 moles) of 93% sulfuric acid was fed in gradually over a period of about 3 hours. The cooling water was removed and after the temperature had dropped a few degrees, indicating that the reaction was complete, heat was applied. The mixture was heated to refluxing temperature and the refluxing liquor collected and the benzenethiol isolated as described in the foregoing example. A yield of 91.8% was obtained.

*Example 3*

Into a glass or glass-lined vessel was charged 500 parts by weight of water and 150 parts by weight (2.3 moles) of zinc dust. The slurry was heated to 35° C. and 88 parts by weight (0.5 mole) of benzene sulfonyl chloride added gradually while keeping the reaction temperature at 35-50° C. Cooling water at 40° C. was used to control the temperature. The water bath temperature was then raised to 46-48° C. and 301 parts by weight (2.85 moles) of 93% sulfuric acid added gradually. The temperature of the reaction mixture was maintained at 50-60° C. during the addition of the acid. After all the acid had been added the water bath was removed, permitting the temperature to rise a few degrees. After the temperature began to fall the mixture was heated to refluxing and the refluxing liquid collected. The benzenethiol isolated as described in Example 1 was obtained in a yield of 91%.

The advantages of the process are especially outstanding as applied to the manufacture of benzenethiol. Although the invention has been illustrated in detail with respect to the manufacture of thiophenol, it is evident that the process may be applied to the manufacture of other thiophenols, as for example α-thionaphthol, β-thionaphthol, thioxylenols and thiocresols. Halogen may be present in the aromatic nucleus but groups reduced by zinc and acid must be absent.

*Example 4*

Into a glass or glass-lined vessel was charged 250 parts by weight of water and 75 parts by weight (1.16 moles) of powdered zinc. The mixture was heated to 73° C. and 47.5 parts by weight (0.25 mole) of p-toluene sulfonyl chloride added in about 11 minutes. 150.5 parts by weight (1.43 moles) of 93% sulfuric acid was then added gradually over a period of about 32 minutes while keeping the temperature of the reaction mixture at 67-79° C. After all of the acid had been added the reaction mixture was heated to refluxing temperature and steam distilled. The solid product was dissolved in a water immiscible solvent, the organic layer separated and the solvent removed to yield 88.5% of p-toluenethiol.

It is intended to cover all changes and modifications of the examples of the invention herein chosen for purposes of disclosure which do not constitute departures from the spirit and scope of the invention.

What is claimed is:

1. In the method of making aryl mercaptans the steps of heating an aryl sulfonchloride with an excess of zinc in water to form zinc aryl sulfinate and then gradually adding a non-oxidizing mineral acid to zinc aryl sulfinate and metallic zinc in aqueous medium at a temperature sufficiently high to effect reaction during the addition.

2. In the method of making benzenethiol the steps of heating benzene sulfonchloride with an excess of zinc in water to form zinc benzene sulfinate and then gradually adding a non-oxidizing mineral acid to an aqueous admixture of zinc benzene sulfinate and metallic zinc at reaction temperature.

3. In the method of making benzenethiol the steps of heating benzene sulfonchloride with an excess of zinc in water to form zinc benzene sulfinite and then gradually adding sulfuric acid to an aqueous admixture of zinc benzene sulfinate and metallic zinc at a temperature sufficiently high to effect reaction during the addition.

4. In the method of making benzenethiol the steps of heating benzene sulfonchloride with an excess of zinc in water to form zinc benzene sulfinate and then gradually adding hydrochloric acid to an aqueous admixture of zinc benzene sulfinate and metallic zinc at a temperature sufficiently high to effect reaction during the addition.

5. In the method of making benzenethiol the steps of heating benzene sulfonchloride with an excess of zinc in water to form zinc benzene sulfinate and then gradually adding sulfuric acid to an aqueous admixture of zinc benzene sulfinate and zinc dust at 50-60° C.

6. The method of making benzenethiol which comprises gradually adding one molecular proportion of benzene sulfonyl chloride to about 4.7 moles of zinc dust slurried in water and keeping the temperature at 35-50° C. during the addition, then gradually adding about 5.7 moles of concentrated sulfuric acid at 50-60° C.

7. The method of making benzenethiol which comprises gradually adding one molecular proportion of benzene sulfonyl chloride to at least 3 moles of zinc dust in warm water, then gradually adding at least 3 moles of sulfuric acid and controlling the reaction by extended cooling and by the rate of the addition of the acid the reduction to benzenethiol being effected during the gradual addition of the sulfuric acid.

References Cited in the file of this patent

UNITED STATES PATENTS

| | | |
|---|---|---|
| 2,148,106 | Cole | Feb. 21, 1939 |
| 2,216,849 | Lubs et al. | Oct. 8, 1940 |